Oct. 28, 1958  G. D. ALFORS ET AL  2,858,415
PHOTOGRAPHIC EQUIPMENT AND CARRYING CASE THEREFOR
Filed Feb. 16, 1956
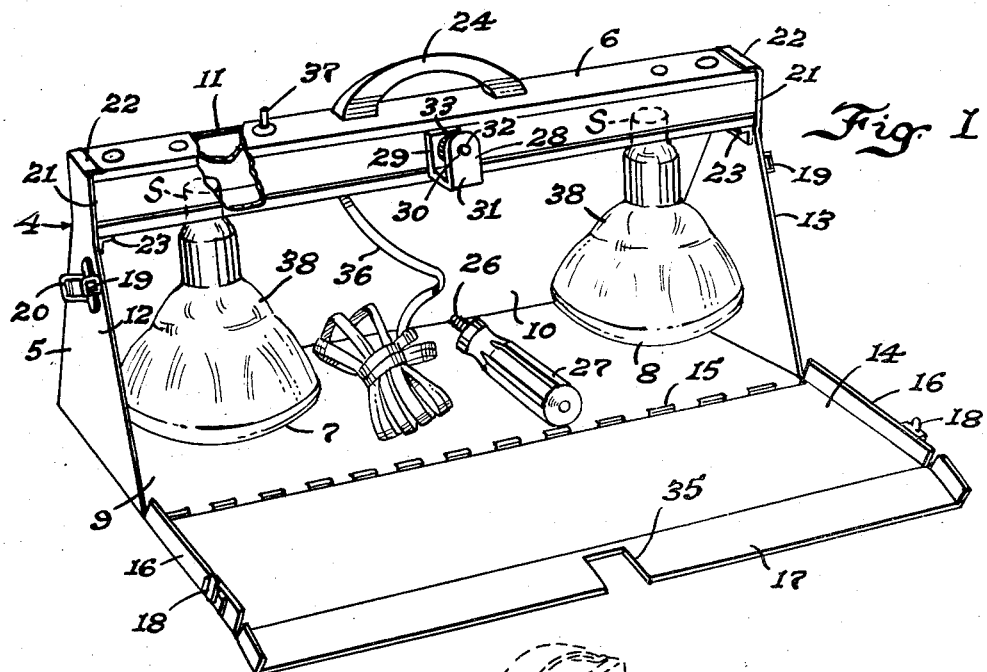
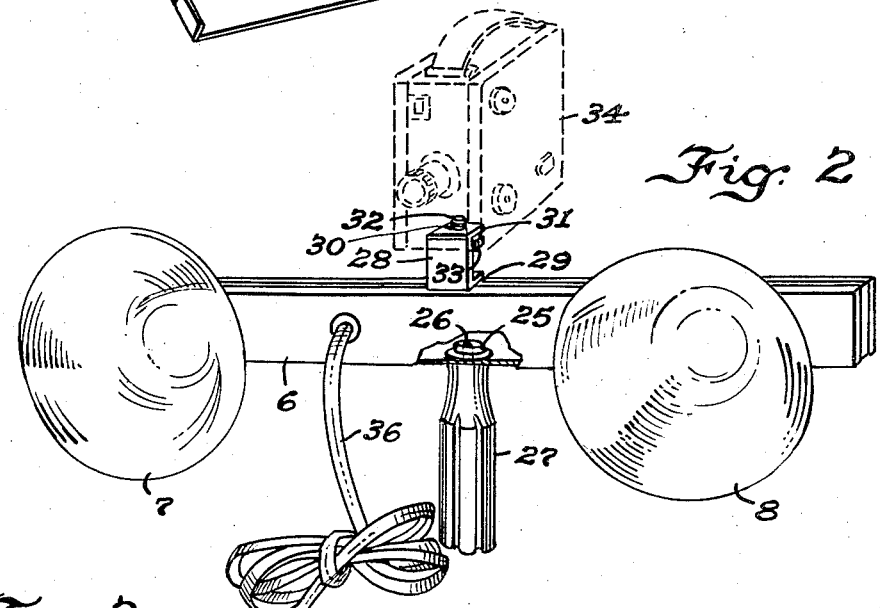
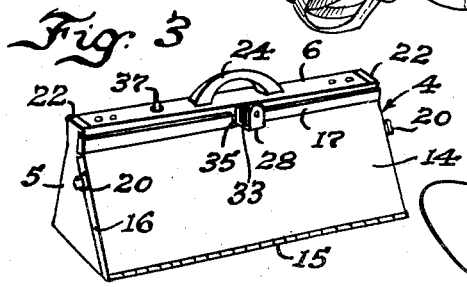
Inventors
Godfrey D. Alfors
Edward W. Lundstrom

United States Patent Office 2,858,415
Patented Oct. 28, 1958

2,858,415

PHOTOGRAPHIC EQUIPMENT AND CARRYING CASE THEREFOR

Godfrey D. Alfors and Edward W. Lundstrom, Rockford, Ill., assignors to Century Tool & Manufacturing Company, Rockford, Ill., a corporation of Illinois Application February 16, 1956, Serial No. 565,803

10 Claims. (Cl. 240—1.3)

This invention relates to a combined holder for photographic flood-lights and carrying case therefor.

The principal object of our invention is to provide a carrying case embodying as a readily removable top part thereof a hollow utility bar on which can be mounted the flood-lights with their reflectors, either separate or built-in, the bar being also equipped with a bracket on one side of which a camera may be readily mounted in the proper spaced relationship to the flood-lights for best results in indoor and outdoor photography, and there being also a handle readily attachable to the bar on the opposite side from the bracket for manual support of the same, the flood-lights having an extension cord connected with sockets provided therefor in the bar, and a switch being also preferably provided on the bar controlling the turning on and off of the lights. The bar is also equipped with a carrying handle which when the bar is inserted in the upper portion of the case with the flood-light bulbs concealed in the case is exposed on top for use in carrying the case, while the removable handle and the extension cord, and anything else that the photographer may wish to carry along, such as an extra flood-light bulb, are stored inside. The carrying case is preferably so designed that the general utility bar mentioned above forms the removable top rail thereof and is slidably received at its opposite ends in channel guides provided therefor in the opposite end portions of the case and has abutment on one side with the upper end portion of a fixed back wall, the front wall being hinged to the case at the bottom to swing upwardly to close position so that its upper end portion holds the bar in place when the two snap fasteners, which are provided on the end walls, secure the hinged front wall in closed position.

The invention is illustrated in the accompanying drawing, in which—

Fig. 1 is a perspective view of the device of our invention showing the case opened preparatory to removal of the general utility bar for use of the flood-lights;

Fig. 2 is a perspective view of the utility bar with the supporting handle attached and indicating in dotted lines how a camera may be mounted on the supporting bracket provided on top, and Fig. 3 is a smaller size perspective view of the device similar to Fig. 1 but showing the case closed.

The same reference numerals are applied to corresponding parts throughout these views.

Referring to the drawing, the device 4 of our invention comprises a carrying case 5 and removable hollow utility bar 6 on which the flood-light bulbs 7 and 8 are mounted in electric lamp sockets provided in the opposite ends of the bar. The case 5 is provided of sheet metal construction throughout for durability, lightness and economy and includes a bottom wall 9, and a back wall 10 bent upwardly from the rear portion of the bottom wall with forward inclination and having a substantially vertical upper end portion 11, this back wall being suitably secured at its opposite ends to the vertical end walls 12 and 13. The front of the case is open but adapted to be closed by a front wall 14 that is hingedly connected to the front portion of the bottom wall 9, as indicated at 15. The hinged front wall 14 has rearwardly bent flanges 16 on the opposite ends arranged to take positions alongside the end walls 12 and 13 when the case is closed, and in that position the upper end portion 17 of the front wall is disposed substantially vertically in spaced substantially parallel relation to the upper end portion 11 of the back wall 10 whereby to retain the bar 6 in place in the case. Tongues 18 carried on flanges 16 secure the front 14 in closed position by entry in sockets 19 provided on the end walls 12 and 13 when snap fastener hasps 20 are snapped to closed position, as in Fig. 3. Channel guides 21 are provided in the opposite ends of the case 5 at the upper ends of the end walls 12 and 13 in front of the upper end portion 11 of the back wall 10 for slidable reception of the end portions of the bar 6, these guides being defined by inwardly bent horizontal flanges 22 on the upper ends of the end walls 12 and 13 and horizontally disposed angle strips 23 welded or otherwise suitably secured to the inner side of the end walls 12 and 13 in parallel relationship to the flanges 22. A carrying handle 24 shown permanently affixed to the top of the bar 6 at the middle thereof serves as a carrying handle for the case when closed, as shown in Fig. 3, and it also can be used to advantage in sliding the bar 6 into and out of the guides 21 when the case is opened, as shown in Fig. 1. It is apparent, therefore, that the device is very handy and that it takes very little time to get the bar 6 out whenever the flood-lights 7 and 8 are to be used, and, on the other hand, it takes very little time to put the bar back into the case. The case with the bar in place and with the hinged front wall 14 closed, as appears in Fig. 3, presents a neat and attractive appearance.

The utility bar 6 has a nut 25 welded or otherwise suitably secured to the inner side of one vertical side wall thereof at the middle to accommodate a screw 26 provided on the end of a supporting handle 27 disposed in a plane at right angles to the axes of the bulbs 7 and 8, as shown in Fig. 2. The handle 27, when removed, is adapted to be stored in the case 5, as shown in Fig. 1. A U-shaped bracket 28 is welded or otherwise suitably secured by one arm 29 of the U to the other vertical side wall of the bar 6 at the middle, opposite the nut 25 and handle 27, and has a hole 30 provided in the other arm 31 through which a screw 32 carried on a knurled head 33 extends for threading into either one of the tripod sockets provided in the bottom and side walls of cameras, so that a camera like that indicated in dotted lines at 34 in Fig. 2 may be mounted on the bar 6 in the proper spaced relationship to the flood-lights for good results in indoor and outdoor photography, wherever flood-lights are needed. A notch 35 is provided in the upper end portion 17 of the hinged front wall 14 to accommodate the bracket 28 when the case is closed, as shown in Fig. 3. A flexible extension cord 36 extends from the bar 6 for connection by means of a plug on the outer end thereof in any available outlet receptacle and this cord has its inner end suitably connected inside the bar 6 with the sockets S that receive the bulbs 7 and 8. A switch, the turnbutton of which is indicated at 37, is also preferably provided in the bar 6 in the light circuit so that the flood-lights may be turned on and off at will and the life of the bulbs 7 and 8 may be increased accordingly by economizing in their use. The bulbs shown have built-in reflectors 38, but, of course, separate reflectors may be provided on the sockets when other bulbs are used.

The operation of the combined holder for photographic flood-lights and carrying case therefor is believed to be clear from the foregoing description. The utility bar 6 can be removed and set up for use by attachment of handle 27 and mounting of the camera thereon in very little time. When the bar 6 is later slid back into place in the case 5 there is room enough between the bulbs 7 and 8 for a spare flood-light bulb in addition to the handle 27 and extension cord 36, and, of course, the photographer may also store other useful items in the case.

It is believed the foregoing description conveys a good understanding of the objects and advantages of our invention. The appended claims have been drawn to cover all legitimate modifications and adaptations.

We claim:

1. In combination, a case for photographic equipment having a bottom wall, opposed end walls and one side wall in rigid relationship to one another, another side wall hinged to the case to swing upwardly to closed position in which its upright upper end portion is in spaced parallel relationship to the upright upper end portion of the first mentioned side wall, means for fastening said hinged side wall in closed position, an elongated bar demountably secured in place between the upper end portions of said side walls, a carrying handle on the top of said bar, and sockets for electrical connection with and support of flood-light bulbs carried on said bar in longitudinally spaced relation on the bottom thereof, whereby the bulbs are protectively housed and concealed in said case.

2. The combination set forth in claim 1 wherein said elongated bar has means on one side of the middle portion thereof for demountable support thereon of a photographic camera in a predetermined relation to the flood-light bulbs.

3. The combination set forth in claim 1 wherein said elongated bar has means on one side of the middle portion thereof for demountable support thereon of a photographic camera in a predetermined relation to the flood-light bulbs, and has means on the opposite side of the middle portion thereof for detachable connection therewith of a bar supporting handle directly below the camera, the handle being adapted to be stored in the case when not in use.

4. In combination, a case for photographic equipment having a bottom wall, opposed end walls and one side wall in rigid relationship to one another, another side wall hinged to the case to swing upwardly to closed position its upright upper end portion is in spaced parallel relationship to the upright upper end portion of the first mentioned side wall, means for fastening said hinged side wall in closed position, horizontal channel guides provided on the inner sides of the upper end portions of the end walls, an elongated bar slidably received at its ends in said guides and held against displacement therefrom between the upper end portions of said side walls, a carrying handle on the top of said bar, and sockets for electrical connection with and support of flood-light bulbs carried on said bar in longitudinally spaced relation on the bottom thereof, whereby the bulbs are protectively housed and concealed in said case.

5. In combination, an elongated case for photographic equipment having a bottom wall, opposed end walls, and opposed side walls, at least one of which is hinged to swing open, means for fastening the latter in closed position, an elongated bar that is of a length to be housed in said case carrying sockets on one side thereof in which flood-light bulbs are mounted in longitudinally spaced relation relative to the bar, and means whereby said bar is demountably but rigidly secured in place in said case longitudinally thereof so that the bulbs are rigidly supported in a fixed spaced relationship to the inside of the case for protection thereof in transit and so that the bar and bulbs are in assembled relationship and ready for immediate use upon removal of the bar from the case, said bar having means on one side thereof for demountably securing the bar to a photographic camera, whereby to hold the flood-light bulbs in a predetermined relationship to the camera.

6. The combination as set forth in claim 5 including a carrying handle permanently secured on the bar at the middle thereof on one side, whereby the case with the bar mounted in it may be carried.

7. The combination as set forth in claim 5 including a carrying handle permanently secured on the bar at the middle thereof on one side, whereby the case with the bar mounted in it may be carried, and there being another handle adapted to be demountably secured to the bar at the middle on another side thereof for support of the bar and camera, or the bar without the camera, for use of the flood-light bulbs.

8. In combination, an elongated case for photographic equipment having a bottom wall, opposed end walls, and opposed side walls, an elongated bar forming the top wall of the case but removable therefrom, means for demountably securing said bar in place in the top of said case, a carrying handle for the case on the top of said bar, and sockets for electrical connection with and support of flood-light bulbs carried on said bar in longitudinally spaced relation on the bottom thereof, whereby the bulbs are protectively housed and concealed in said case.

9. The combination set forth in claim 8 wherein said elongated bar has means on one side of the middle portion thereof for demountable support thereon of a photographic camera in a predetermined relation to the flood-light bulbs.

10. The combination set forth in claim 8 wherein said elongated bar has means on one side of the middle portion thereof for demountable support thereon of a photographic camera in a predetermined relation to the flood-light bulbs, and has means on the opposite side of the middle portion thereof for detachable connection therewith of a bar supporting handle directly below the camera, the handle being adapted to be stored in the case when not in use.

References Cited in the file of this patent

UNITED STATES PATENTS

| | | |
|---|---|---|
| De156,276 | Powell | Nov. 29, 1949 |
| 1,392,441 | Nikonow | Oct. 4, 1921 |
| 1,521,610 | Finesilver | Jan. 6, 1925 |
| 2,285,868 | Muller | June 9, 1942 |
| 2,530,912 | Secofsky et al. | Nov. 21, 1950 |
| 2,560,200 | Werzyn | July 10, 1951 |
| 2,777,939 | Spath | Jan. 15, 1957 |

FOREIGN PATENTS

| | | |
|---|---|---|
| 456,815 | Germany | Mar. 2, 1928 |